United States Patent [19]

Pou

[11] Patent Number: 5,071,574

[45] Date of Patent: Dec. 10, 1991

[54] PROCESS AND COMPOSITIONS FOR REDUCING THE CORROSIVENESS OF OXYGENATED SALINE SOLUTIONS BY STRIPPING WITH ACIDIC GASES

[75] Inventor: Tang E. Pou, Paris, France

[73] Assignee: CECA, S.A., Paris, France

[21] Appl. No.: 505,704

[22] Filed: Apr. 5, 1990

[30] Foreign Application Priority Data

Apr. 10, 1989 [FR] France .................. 89 04686

[51] Int. Cl.$^5$ .............. C23F 11/14; C23F 11/18; C09K 7/04; E21B 41/02

[52] U.S. Cl. .................. 252/8.555; 252/80; 252/146; 252/148; 252/544; 252/400.53; 252/390; 252/392; 252/394; 252/389.53; 252/401; 252/403; 252/405; 252/407; 106/14.41; 106/14.42; 106/14.44; 106/14.15; 106/14.17; 106/14.21; 422/16

[58] Field of Search .......... 252/80, 146, 148, 544, 252/400.53, 390, 392, 394, 389.53, 401, 403, 405, 407, 8.555; 106/14.41, 14.42, 14.46, 14.15, 14.17, 14.21; 422/16

[56] References Cited

U.S. PATENT DOCUMENTS

| | | | |
|---|---|---|---|
| 2,510,063 | 6/1950 | Bried | 252/148 |
| 2,739,980 | 3/1956 | Chester | 252/392 X |
| 2,894,905 | 7/1959 | Bernard | 252/392 X |
| 3,088,796 | 5/1963 | Kahler et al. | 252/392 X |
| 3,094,490 | 6/1963 | Gardner | 252/149 |
| 3,113,113 | 12/1963 | Marsh | 252/392 |
| 3,186,946 | 6/1965 | Sluhan | 252/392 X |
| 3,520,820 | 7/1970 | Hwa | 252/311 |
| 3,618,667 | 11/1971 | Snavely | 166/310 |
| 3,657,129 | 4/1972 | Obermeier | 252/392 X |
| 3,860,430 | 1/1975 | Walker et al. | 252/392 X |
| 3,931,043 | 1/1976 | Walker et al. | 252/392 |
| 4,420,414 | 12/1983 | Valone | 252/392 |

FOREIGN PATENT DOCUMENTS 2202167 9/1988 United Kingdom .

OTHER PUBLICATIONS

N. Adams et al., H$_2$S Corrosion Control in the Mud System, May 1980, vol. 52, No. 6, pp. 114–120, Petroleum Engineer International.

Weres et al., Catalytic Oxidation of Aqueous Hydrogen Sulfide in the Presence of Sulfite, Jun. 1985, vol. 41, No. 6, pp. 307–316.

*Primary Examiner*—Robert L. Stoll
*Assistant Examiner*—Chhaya Sayala

[57] ABSTRACT

A process for reducing the corrosiveness of aerated aqueous solutions, which comprises stripping the oxygen with gas containing hydrogen sulfide after addition of a composition which is both catalytic of the reduction of oxygen by hydrogen sulfide gas and inhibiting of hydrogen sulfide corrosion, such composition comprising certain metallic salts and a water-soluble oxyethylenated amine.

8 Claims, No Drawings

PROCESS AND COMPOSITIONS FOR REDUCING THE CORROSIVENESS OF OXYGENATED SALINE SOLUTIONS BY STRIPPING WITH ACIDIC GASES

BACKGROUND OF THE INVENTION

The present invention pertains to a process for reducing the corrosiveness to iron of an oxygenated aqueous solution by stripping with natural gases containing hydrogen sulfide acid in the presence of a deoxygenation catalyst. The invention also encompasses the composition used as the deoxygenation catalyst.

Water is reinjected into hydrocarbon deposits in order to maintain the deposit under a pressure which is sufficient for its exploitation and preservation. The injection waters are generally saline. In an off-shore environment, the waters are saline because seawater is employed to refill the deposits. On dry land, since fresh water is valuable for other applications, use is made of drilling water- or recovery water, which are charged with mineral salts. These waters are also charged with dissolved oxygen, either because of their contact with the atmosphere or because of their applications which are never carried out in an inert atmosphere. It is known that oxygenated, saline waters are very corrosive to iron and steel. Therefore, the stripping technique is used to purge these waters of their dissolved oxygen. Deaerated gases are used for this purpose. In hydrocarbon fields, there is an abundant supply of gases essentially constituted of light hydrocarbons, but which contain $H_2S$ gas in noteworthy proportions. Since deoxygenation by means of stripping is not total, the result is that the waters that could be treated with such gases and which still contain some oxygen, would be charged with hydrogen sulfide acid. Now, if we let $V$, $V_2$, $V_3$ and $V_4$ represent the corrosiveness of saline waters free of oxygen and hydrogen sulfide ($V_1$), oxygenated only $V_2$), only charged with hydrogen sulfide ($V_3$), or charged with both oxygen and hydrogen sulfide ($V_4$), respectively, then their corrosiveness can be ranked as follows: $V_4 >> V_2 > V_3 >> V_1$, and thus the stripping of oxygen by means of petroleum gases is, at the very least, very unsatisfactory with regard to the conservation of metal installations.

Both the operation of prior desulfuration of the stripping gases, on the one hand, and the operation of total deoxygenation of the stripping water, on the other hand, are time-consuming and costly. In addition, they require bulky materials that cannot be shipped to off-shore platforms. The problem addressed by the applicant, and which has been resolved with the present invention, is the development of an additive that can limit the corrosion of installations by waters retaining oxygen in solution, particularly saline waters, in the presence of noteworthy amounts of hydrogen sulfide.

The problem has already been raised by the aggressiveness of $H_2S$ brines, the corrosiveness of which is considerably increased when they are charged with oxygen from simple contact with the atmosphere. A solution to this problem was disclosed in U.S. Pat. No. 3,618,667 of E. Snavely (Mobil Oil Corporation), according to which the parasitic oxygen is eliminated by catalyzing its reduction by the $H_2S$ gas present by addition of transition metal salts. Thus, the level of corrosion is reduced to that which characterizes non-oxygenated $H_2S$ solution. Since then, the mechanisms of the catalytic reaction of oxygen on dissolved hydrogen sulfide acid have been scientifically analyzed by O. Were, S.L. Tsao and R.M. Chhatre in *Corrosion*, Vol. 41, Issued 6, 1985.

It was found that this mechanism of catalytic reduction could be used to obtain the reduction of the corrosiveness of oxygenated saline waters, by stripping them with a stream of gas not containing oxygen but, in contrast, charged with hydrogen sulfide acid. In order for such an operation to yield a valid industrial result, it is necessary that this stripping not create a situation of corrosive synergy by charging with hydrogen sulfide acid the saline aqueous fluid which has had its dissolved oxygen incompletely removed. Catalysis with transition metal salts in accordance with Snavely, of course, makes it possible to avoid such a situation. But the saline solution has now been charged with hydrogen sulfide acid and thus corrosion from oxygen has been replaced by corrosion from hydrogen sulfide acid which, although present with a less dramatic appearance, still remains at an unacceptable level. The combination of transition metal salts and the conventional inhibitors of $H_2S$ corrosion (fatty chain cationic derivatives, notably salts of fatty amines, fatty-chain quaternary ammonium salts) do not provide the desired solution because these compounds have the annoying property, in this context, of blocking the catalysis of $H_2S$ decomposition by oxygen.

SUMMARY OF THE INVENTION

The applicant discovered that, in a surprising manner, it was possible to effectively reduce the corrosiveness of aerated aqueous solutions, particularly saline solutions, to ferrous metals by stripping the said aerated waters with gases containing hydrogen sulfide if one added to them a composition combining salts of metals from columns VIII and Ib, row 4 of the Periodic Table of Elements and certain oxyalkylated fatty chain alkylamines.

The composition in accordance with the invention consists essentially of a water-alcohol solution of a metallic salt of nickel, cobalt, copper, or iron, and an oxyalkylated fatty amine. The metallic salt is a water-soluble salt, generally the sulfate or chloride. The oxyalkylated fatty amine is generally the product resulting from the oxyalkylation of a monoamine or a polyamino (ethyl or propyl) amine with an aliphatic chain containing 10 to 22 carbon atoms; generally preferred is oxyalkylation with ethylene oxide which results in derivatives which are easily soluble in water and saline solutions.

A preferred compound of the invention is the condensation product of amines with an alkyl chain of about 12 carbon atoms, with 7 to 15 molecules of ethylene oxide. The water-alcohol mixture is homogeneous and selected to dissolve both the metallic salt and the oxyalkylated amine. Preferably, use is made of water-ethanol mixtures, or, more advantageous, with water-ethylene glycol mixtures, which have a very high flash point and very low freezing point, making them suitable for the formulation of products exposed in the field to all types of weather conditions.

DETAILED DESCRIPTION

In the composition according to the invention, the weight ratio between the metal and the oxyalkylated fatty amine is between 5:30 and 25:30; the active material content, which is taken as the sum of the metal and the oxyalkylated fatty amine, is between 15 and 55%;

the alcohol solvent has a weight proportion between approximately 5 and 20%.

These compositions are used by dissolving them in aqueous media with an H₂S level between approximately 10 ppm and the saturation limit, i.e., approximately 1,500 ppm, at the rate of approximately 20 ppm of these compositions per ppm of dissolved oxygen remaining present after stripping. Technicians will appreciate the very large tolerance of this dosage of composition according to the invention.

The use of the compositions according to the invention is particularly advantageous for the reinjection of off-shore oil or gas wells, where there is available an abundant supply of oxygen-saturated seawater for use as reinjection fluid and of acidic hydrocarbon gas for its stripping. The procedure according to the invention is obviously not limited to off-shore installations. It can be applied just as advantageously for the reinjection of hydrocarbon formations on dry land using saline recovery waters, the extraction processes for which have already been used and reoxygenated them.

The invention will be further described in connection with the following examples which are set forth for purposes of illustration only and in which:

(i) ferrous metal specimens constituted of steel type N80 were subjected to corrosion;
(ii) use was made of synthetic seawater in accordance with ASTM Standard D 1141;
(iii) the following were monitored:
  (a) the hydrogen sulfide acid levels by iodometric determination; and
  (b) the dissolved oxygen levels by oxygen probe; and
(iv) the instantaneous corrosion rates were measured by the classic potentiodynamic method (Tafel line method).

EXAMPLE 1

The additive A1 according to the invention here has the following compositions by weight:

| | |
|---|---|
| Nickel sulfate | 5 |
| Noramox* CD11 | 30 |
| 96% sulfuric acid | 2 |
| Ethylene glycol | 10 |
| Antifoaming agent | 0.2 |
| Water | 52.8 |

*Noramox CD 11, an oxyethylenated amine marketed by CECA S.A, is constituted of a copra chain primary fatty amine, oxyethylated at the rate of 11 molecules of ethylene oxide per amine molecule.

To seawater balanced at 7 ppm of oxygen, and to which variable amounts of hydrogen sulfide had been added by bubbling through hydrogen sulfide gas, 140 ppm of the above additive (20 ppm per ppm of O₂) was added and the variation in the oxygen level was followed over time. It was verified in advance that the presence of hydrogen sulfide did not lead to any noticeable change in the response of the oxygen probe.

The results are set forth in Table I. It can be seen that when the H₂S level reached 20 ppm, the additive induced the almost total disappearance of the dissolved oxygen within a few minutes.

TABLE 1

Destruction Of The Oxygen In H₂S Seawater In The Presence Of 20 ppm Of Additive A1 In Accordance With Example 1 per ppm Of Dissolved Oxygen

| H₂S (ppm) | DURATION (minutes) | | | | | | | |
|---|---|---|---|---|---|---|---|---|
| | 0 | 1 | 2 | 4 | 6 | 8 | 10 | 12 |
| 10 | 7 | 7 | 7 | 6.6 | 6.0 | 5.3 | 4.8 | 4.1 |
| 20 | 7 | 6.8 | 5.9 | 3.3 | 1.7 | 0.6 | 0.07 | 0.04 |
| 50 | 7.1 | 6.8 | 4.8 | 1.6 | 0.055 | 0.04 | | |
| 100 | 7.2 | 6.6 | 4.5 | 1.3 | 0.03 | | | |
| 200 | 6.6 | 4.9 | 2.8 | 0.15 | 0.02 | | | |

EXAMPLE 2

(Comparative)

The test was carried out under the same general conditions as in Example 1, but additive A1 was replaced by additive A2 of composition:

| | |
|---|---|
| Nickel sulfate | 5 |
| Quaternary ammonium salt* | 30 |
| 96% sulfuric acid | 2 |
| Ethylene glycol | 10 |
| Antifoaming agent | 0.2 |
| Water | 52.8 |

*In this formulation, the quaternary ammonium salt employed is Noramium DA 80 from SECA S.A., which is a solution of copra-dimethyl-benzyl-ammonium chloride.

The results, which are set forth in Table II, show a blocking of the oxygen consumption reaction by the quaternary ammonium salt, whereas when catalyzed by the additive according to the invention, the reaction continues until complete disappearance of the oxygen.

The same blocking is recorded when, in place of a quaternary alkyl ammonium salt, use is made of an amphoteric derivative such as, for example, sodium copra aminopropionate of (carboxymethyl) copra dimethylammonium chloride.

TABLE II

Destruction Of The Oxygen In H₂S Seawater (100 ppm of H₂S) In the Presence of 200 ppm of Additive A2 per ppm of Dissolved oxygen

| | DURATION (minutes) | | | | | | | |
|---|---|---|---|---|---|---|---|---|
| | 0 | 1 | 2 | 4 | 6 | 8 | 10 | 12 |
| Additive A1 | 7.2 | 6.6 | 4.5 | 1.3 | 0.03 | 0 | 0 | 0 |
| Additive A2 | 7.0 | 6.8 | 6.8 | 6.7 | — | 6.6 | — | 6.4 |

EXAMPLE 3

In this example, use is made of the additive from Example 1 at the rate of 150 ppm.

Various treatments were applied to a seawater which was initially close to saturation in oxygen (7.5 ppm of O₂) and the instantaneous corrosion rate was measured on steel N80 immersed in the medium. The measurement was carried out approximately 10 minutes after treatment of the seawater.

The results are presented in Table III, which shows the very noticeable reduction in corrosion resulting from application of the procedure according to the invention.

TABLE III

| | Corrosiveness of saline solutions Additive A1 | | | |
|---|---|---|---|---|
| | | Partially deaerated with nitrogen | | |
| Corrosive Solution | Aerated | Unchanged | +100 ppm H₂S | +100 ppm H₂S +40 ppm of additive A1 |
| Dissolved O₂ ppm | −7.2 | −2 | 2 | −0 |
| Corrosion rate mm/year | 2.15 | 0.6 | 0.9 | 0.15 |

EXAMPLE 4

(Comparative)

Here we compare the results obtained with, on the one hand, the inhibitor of composition A1 according to the invention and, on the other hand, a formulation A4 according to the prior art:

| | |
|---|---|
| Nickel sulfate | 5 |
| 96% sulfuric acid | 2 |
| Ethylene glycol | 10 |
| Antifoaming agent | 0.2 |
| Water | 82.8 |

In both cases, the saline solution constituted of ASTM seawater was initially aerated then partially deaerated with nitrogen, loaded with 100 ppm of H₂S. These saline solution contain 40 ppm of additive A1 according to the invention and 40 ppm of additive A4 according to the prior art, respectively. In both cases, there was a rapid disappearance of the oxygen, but the medium treated with inhibitor A4 remained corrosive as can be seen by the results shown in Table IV.

TABLE IV

| | Corrosiveness of saline solutions. Additives A1 and A4 | | | |
|---|---|---|---|---|
| | | Partially deaerated with nitrogen | | |
| Corrosive Solution | Un-changed | +100 ppm H₂S | +100 ppm H₂S +40 ppm of additive A1 | +100 ppm H₂S +40 ppm of additive A4 |
| Dissolved O₂ ppm | −2 | 2 | −0 | −0 |
| Corrosion rate mm/year | 0.5 | 0.9 | 0.15 | 1.0 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for reducing the corrosiveness toward ferrous metals of an aerated aqueous liquid, comprising stripping said liquid with a gas containing hydrogen sulfide after addition to said liquid of a catalytic and H₂S-corrosion inhibiting amount of a composition containing 5 to 25% of a water-soluble salt of iron, nickel, cobalt, or copper and 10 to 30% of an oxyalkylated fatty amine of general formula:

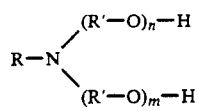

in which R is a saturated or unsaturated $C_{10}$ to $C_{16}$ alkyl radical,
R' is a $C_2$ to $C_4$ alkyl radical, and n and m are each whole, non-zero numbers such that n + m is between 7 and 15.

2. The process of claim 1, wherein the water-soluble metal salt contained in the composition which is both catalytic of the reduction of oxygen and inhibiting of said hydrogen sulfide corrosion is a nickel salt.

3. The process of claim 1, wherein the oxyalkylated fatty amine is a fatty chain amine of copra oxyalkylated at approximately 11 molecules of ethylene oxide.

4. The process of any one of claims 1 to 3, wherein said composition also contains a water-alcohol solvent in addition to the water-soluble metallic salt and the oxyalkylated fatty amine.

5. A composition for use in reducing the corrosiveness of partially deaerated aqueous solutions by stripping with acidic gases, comprising:
   (a) from 5 to 25% by weight of a water-soluble salt of iron, nickel, cobalt, or copper, and
   (b) from 10 to 30% by weight of an oxyalkylated fatty amine of general formula

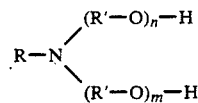

in which R is a saturated or unsaturated C10 to C16 alkyl radical, R' is a $C_2$ to $C_4$ alkyl radical, and n and m are each whole, non-zero numbers such that n+m is between 7 and 15.

6. The composition of claim 5, wherein the water-soluble salt is a nickel salt.

7. The composition of claim 5, wherein the oxyalkylated fatty amine is a fatty chain amine of copra oxyalkylated at approximately 11 molecules of ethylene oxide.

8. The composition of any of claims 5 to 7, wherein the composition also contains a water-alcohol mixture capable of dissolving both said salt and said oxyalkylated fatty amine.

* * * * *

UNITED STATES PATENT AND TRADEMARK OFFICE
CERTIFICATE OF CORRECTION

PATENT NO. : 5,071,574

DATED : December 10, 1991

INVENTOR(S) : Pou, Tong E.

It is certified that error appears in the above-identified patent and that said Letters Patent is hereby corrected as shown below:

On the title page, cancel "Tang" and substitute therefor -- Tong --.

Column 6, line 45, cancel "C10 to C16" and substitute therefor -- $C_{10}$ to $C_{16}$ --.

Signed and Sealed this

Ninth Day of March, 1993

Attest:

STEPHEN G. KUNIN

*Attesting Officer*   *Acting Commissioner of Patents and Trademarks*